(No Model.)
H. W. GRELLE.
FILTER.
No. 399,031. Patented Mar. 5, 1889.
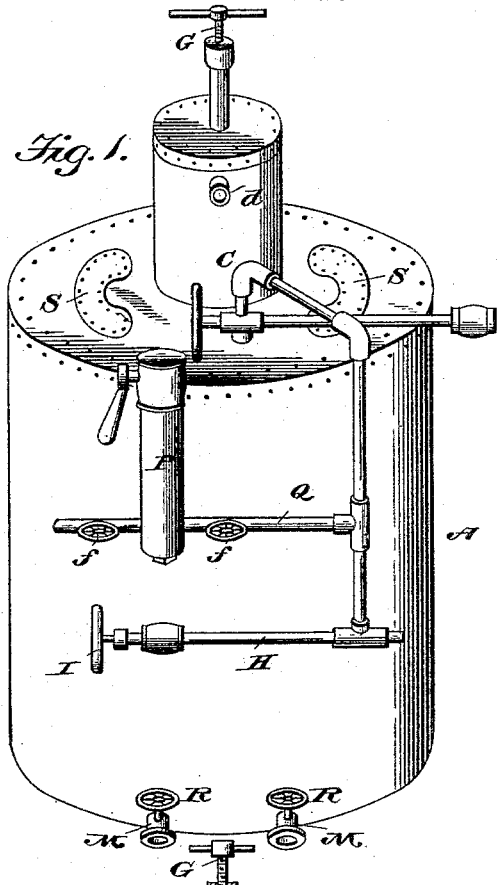
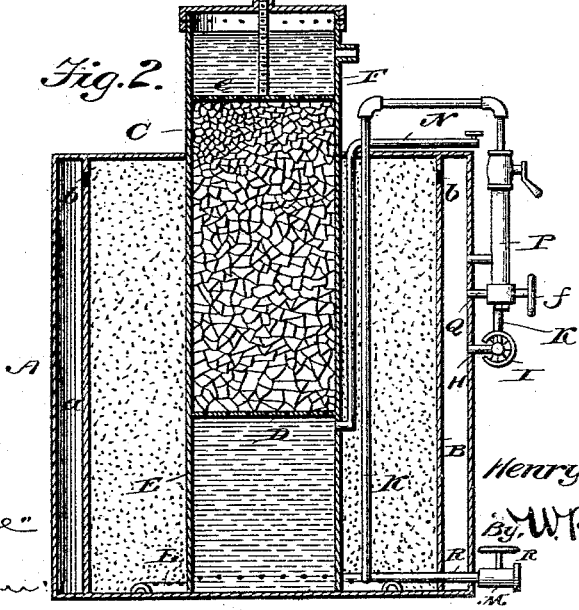
Witnesses:
Inventor:
Henry W. Grelle.
By W. R. Stringfellow
Attorney.

UNITED STATES PATENT OFFICE.

HENRY WILLIAM GRELLE, OF NEW ORLEANS, LOUISIANA.

FILTER.

SPECIFICATION forming part of Letters Patent No. 399,031, dated March 5, 1889.

Application filed September 7, 1888. Serial No. 284,819. (No model.)

*To all whom it may concern:*

Be it known that I, HENRY WILLIAM GRELLE, a citizen of the United States, residing at New Orleans, in the parish of Orleans and State of Louisiana, have invented certain new and useful Improvements in a Filter; and I do declare the following to be a full, clear, and exact description of the invention, such as will enable others skilled in the art to which it appertains to make and use the same.

This invention relates to an improvement in filters for the continuous filtration of water, and the novelty will be fully understood from the following description and claim when taken in connection with the accompanying drawings, in which—

Figure 1 is a perspective view of a filter with my improvements applied, and Fig. 2 is a vertical sectional view of the same.

Referring by letter to the said drawings, A indicates the main case, which is preferably of a cylindrical form and of any suitable size. Within this outer case or cylindrical frame A is a filtering or sand chamber, B, sufficiently small with respect to the outer case, A, so as to form a water-chamber, $a$, between the two. The case B is filled with sand or filtering material, as shown, and has a communication with the chamber $a$ at its upper end by means of the perforations $b$ therein. Within this sand or filtering chamber and centrally therein is a filtering-chamber, C. This latter chamber is designed to contain gravel, pebbles, or the like, while the chamber B contains sand or a finer filtering material. The chamber C is provided with a perforated bottom, D, arranged at a sufficient elevation to form a water-chamber, E, beneath it for the water to be filtered, a chamber, F, being formed at the upper end of the said chamber C to receive the pure filtered water before being discharged for use through the aperture or spout $d$. The floor or bottom of the pure-water chamber F comprises a perforated disk, $e$, which is designed to be moved and compressed upon the gravel or pebbles in the chamber C by means of a screw-shaft, G. This screw-shaft G is seated in a screw-tapped aperture in the cover of the clear-water chamber, as shown, and may be provided with a cross-bar, so that the said rod may be turned to raise or lower the disk $e$ in the chamber F.

It will be observed that the pure-water chamber is elevated above the filtering-chambers, so that the water to be filtered has no way of entering the clear-water chamber until it has entirely traversed the filtering material and been freed of its impurities.

H indicates a horizontal pipe, one end of which is provided with a valve, I, and has a connection at such end with the interior of the outer case, A, the flow of water thereto being governed by the said valve I. The opposite end of this pipe H is designed to connect with a hydrant or other water-supply, and the water to be filtered after entering the pipe H is allowed to enter the chamber A.

Leading from a T-coupling of the pipe H is a vertical branch pipe, K, which enters the top of the chamber B and passes down through the same to the bottom thereof, where it connects with a wash-out pipe, L. This wash-out pipe L is arranged concentric to the chamber E within the chamber B, and is provided with perforations, as shown, so that while water may be admitted for cleaning or washing-out purposes it will be forcibly let into the said chamber in numerous jets or sprays, after which it may be discharged together with the sediment through the spouts or valve-outlets M.

N indicates a pipe which leads from the impure-water chamber E to the outside of the main case A. This pipe N is provided at its outer end with a valve, so that the water in the said chamber E, before entering the gravel-chamber, may be drawn off for inspection.

The chamber E has its walls perforated, so as to allow the water after passing through the sand or filtering material in the chamber B to pass up through the perforated bottom D into the gravel or pebble chamber.

P indicates an air-pipe, which also communicates with the chamber $a$ through the medium of pipe Q, and is provided at its upper end with a cock, so that the air may be admitted to the said chamber or prevented from leaving, if desired.

Q indicates a pipe leading from the upright pipe K and communicating with the chamber a. This pipe is provided with valves f, as shown, whereby communication may be effected between the said pipe K, and consequently the supply-pipe, and the chamber a. By this arrangement it will be seen that water may be let into the filter through the pipe Q, and when it is desired to wash out the filter from sediments and the like the valves in the pipe Q may be closed, when the water from the supply will be carried through the pipe K and down to the wash-out pipe L in the bottom of the filter.

The pipe P is considered absolutely necessary in exhausting the air from the chamber a, so that the water may be allowed to flow into the filter.

It will be observed that the pipe N communicates with the chamber E at its highest point, so that the water drawn therefrom may be the purest in the chamber.

It will be observed that the outlet-valves connect with the lowest point of the filtering-chambers by means of pipes R, so that all of the sediment and impurities raised in cleaning or washing out may be removed.

S indicates man-holes arranged in the top of the case, whereby access may be had thereto for removing and replacing the filtering material.

Having described my invention, what I claim is—

The combination, with the outer casing, A, of the sand-chamber B, arranged therein and having perforations near its upper end, as shown, to communicate with the chamber a, the gravel-chamber C, arranged centrally in the sand-chamber and having at its lower end the water-chamber E and at its opposite or upper end a pure-water chamber, F, the said gravel-chamber having a perforated bottom, D, and a removable perforated top carrying a pressure-screw, F, which has a bearing in the top of the pure-water chamber, the perforated pipe L, arranged in the sand-chamber and concentric to the water-chamber E, valved pipes leading from said chamber, the pipe N, leading from the upper portion of the water-chamber E and provided with cocks, the pipe H, provided with the valve and communicating with the chamber a, the pipe K, leading from the pipe H and communicating with the perforated pipe in the said chamber, the pipe Q, provided with valves and connecting a pipe, K, with the chamber a, and the air-pipe P, also connected with the chamber a, substantially as specified.

In testimony whereof I affix my signature in presence of two witnesses.

HENRY WILLIAM GRELLE.

Witnesses:
GEORGE F. HERBER.
JANNES GOODWIN, Jr.